United States Patent
Laurent et al.

(10) Patent No.: US 6,330,206 B1
(45) Date of Patent: Dec. 11, 2001

(54) HYDROPHONE FOR ACOUSTIC OR SEISMIC WAVE RECEPTION

(75) Inventors: Jean Laurent, Marseilles; Georges Constantinou, La Varenne Saint Hilaire, both of (FR)

(73) Assignees: Institut Francais du Petrole; Vinci Technologies, both of Rueil-Malmaison Cedex (FR)

( * ) Notice: Subject to any disclaimer, the term of this patent is extended or adjusted under 35 U.S.C. 154(b) by 0 days.

(21) Appl. No.: 09/553,943

(22) Filed: Apr. 21, 2000

(30) Foreign Application Priority Data

Apr. 26, 1999 (FR) .................................................. 99 05289

(51) Int. Cl.⁷ .................................................. H04R 17/00
(52) U.S. Cl. ............................................................ 367/173
(58) Field of Search .................................... 367/155, 163, 367/165, 173, 174, 188; 310/337

(56) References Cited

U.S. PATENT DOCUMENTS 4,700,177   10/1987   Nakashima et al. .................. 340/388
5,838,637 * 11/1998   Constantinou et al. .............. 367/173

FOREIGN PATENT DOCUMENTS 2748183   10/1997   (FR) .

* cited by examiner

*Primary Examiner*—Daniel T. Pihulic
(74) *Attorney, Agent, or Firm*—Antonelli, Terry, Stout & Kraus, LLP

(57) ABSTRACT

Hydrophone with two unsymmetrically connected sensitive elements. The hydrophone comprises a detection unit including a closed housing (1) delimited by two cups (2, 3) resting against each other, each one being provided with a flexible diaphragm (4) and at least two piezoelectric sensitive elements (6, 8) associated each with electrodes (7, 9), one outside the housing, the other inside the housing. The two sensitive elements are preferably different in size, notably with different diameters. Electrodes (7a, 9a) of the sensitive elements that are not in contact with cups (2, 3) are electrically interconnected and the electrodes in contact with cups (2, 3) are also electrically interconnected. Each detection unit is preferably included in a protective assembly (not shown). The hydrophone can be used for marine seismic monitoring or prospecting for example.

12 Claims, 4 Drawing Sheets

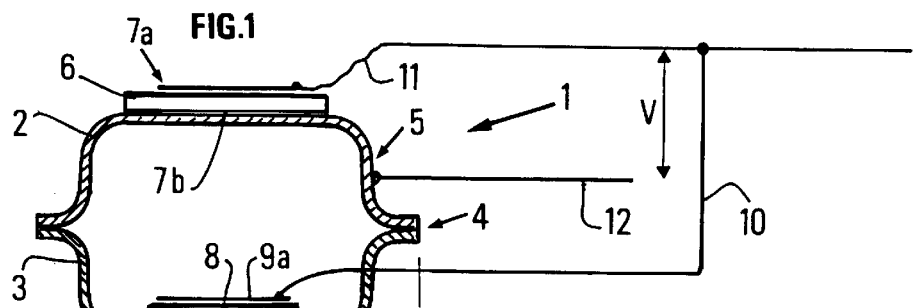
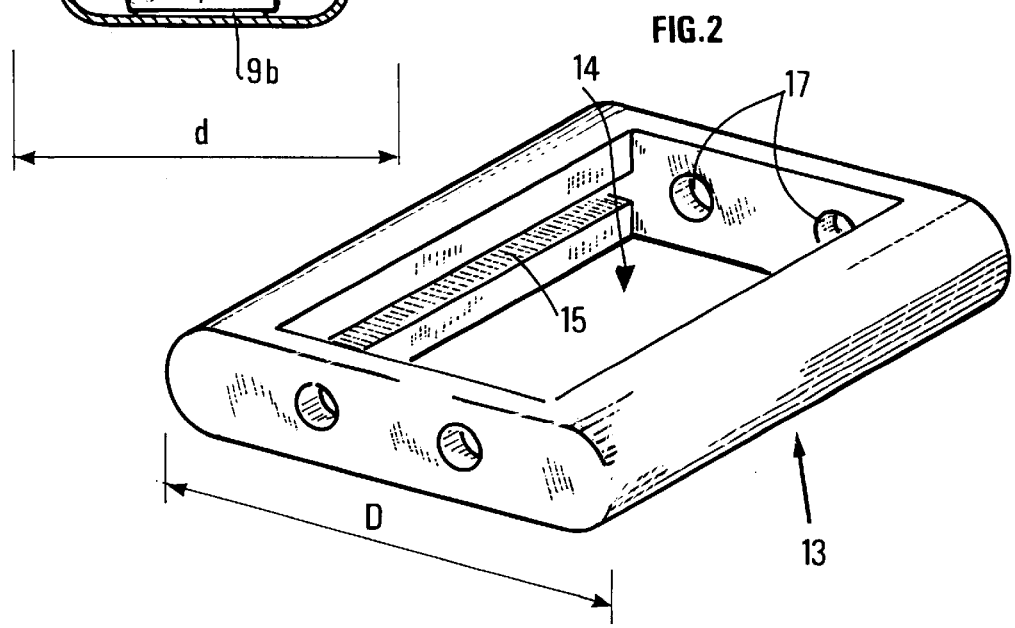
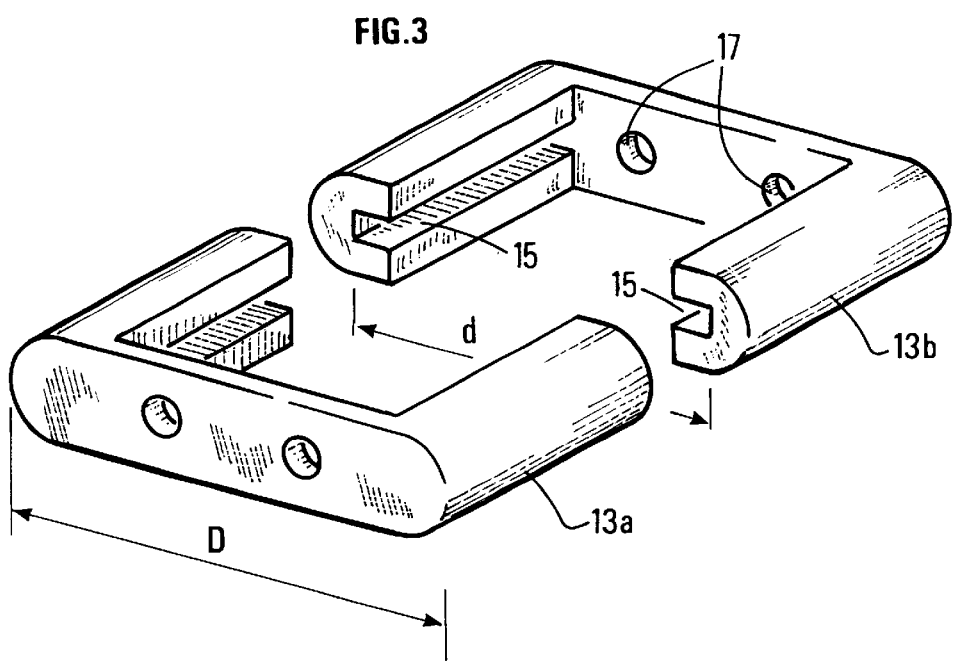

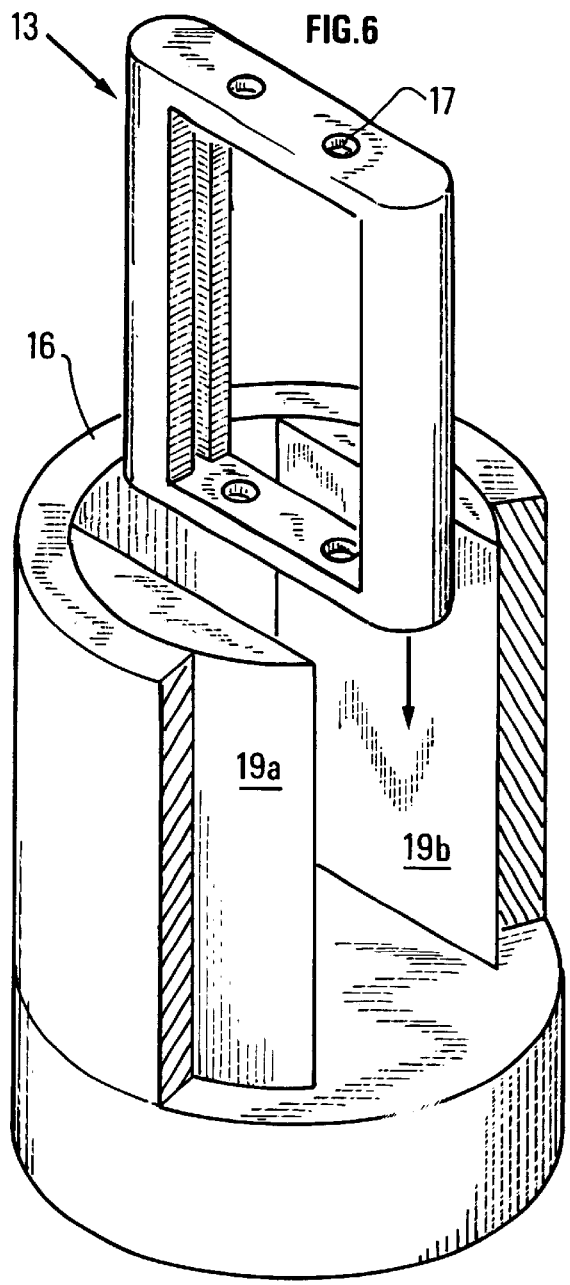
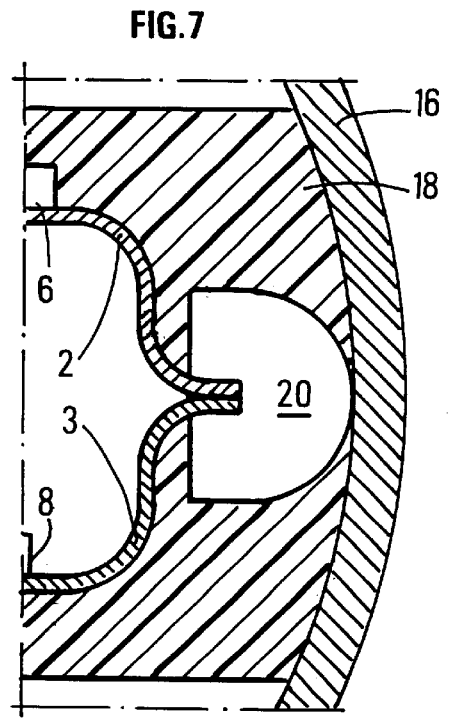
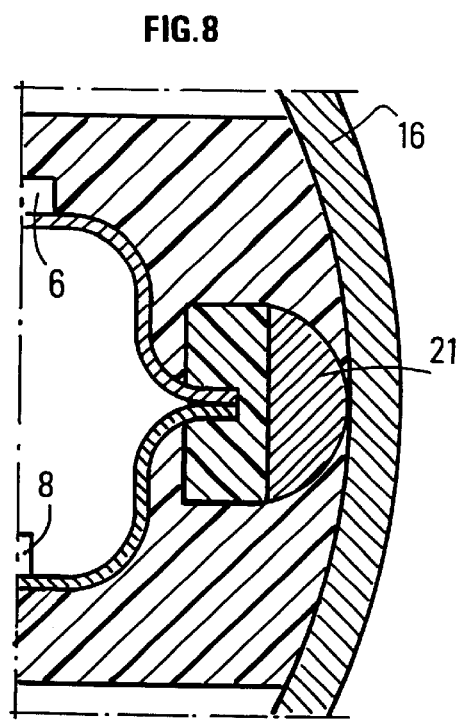

HYDROPHONE FOR ACOUSTIC OR SEISMIC WAVE RECEPTION

FIELD OF THE INVENTION

The present invention relates to a hydrophone intended for reception of acoustic or seismic waves.

BACKGROUND OF THE INVENTION

The prior art in the field of piezoelectric hydrophones is illustrated for example by patents FR-1,556,971; 2,122,675; 2,733,831 or 2,748,183 or by U.S. Pat. Nos. 3,970,878; 4,336,639 or 4,926,397; 5,541,894 or 5,815,466.

It is well-known to form a hydrophone by assembling elements sensitive to pressure variations, consisting each of a disk made of a piezoelectric ceramic, associated with a pair of electrodes arranged on either side. Each disk is stuck onto a flexible support such as a diaphragm, one face of which is exposed to the pressure variations to be measured.

The flexible support is for example a diaphragm supported by a rigid housing or the central part of a cup whose peripheral part is reinforced and rigid, resting against an identical cup, itself carrying one or more sensitive elements, the two cups delimiting a housing. The electrodes of the two sensitive elements are electrically interconnected so as to compensate for parasitic effects due to accelerations.

When the outside static pressure increases, the two plates bend until they rest against each other. Their spacing is so selected that their maximum deformation, when they are pressed against each other, remains within the elastic deformation limits. The pickup is thus protected against accidental overpressures. The housing thus formed can be coated with a layer of a material transparent to acoustic waves.

The sensitive elements can be externally fastened to the housing and provided with a protective coating (such as a varnished araldite layer) so as to maintain a sufficient electric insulation between the electrodes. The sensitivity of this type of hydrophone is good and does not vary much (less than 10% for a static pressure of 10 MPa for example) with the hydrostatic pressure.

According to another well-known layout, the sensitive elements are fastened to the inner faces of the cups and therefore inside the housing, which provides good protection against the outside medium. However, with this layout, the piezoelectric sensitive elements, which are sintered ceramic disks and therefore relatively fragile, may be damaged through crushing when the hydrostatic pressure increase presses them against each other by bending the plates. The sensitivity of hydrophones with sensitive elements inside the housing is lower and it greatly decreases when the hydrostatic pressure increases, a phenomenon attributed to their being fastened to a face that becomes convex.

It is also well-known to combine the two previous types in a hydrophone with two diaphragms delimiting a closed housing, each one carrying a pair of sensitive elements, one outside the housing, the other inside, the two pairs being electrically interconnected in parallel so as to compensate for certain drawbacks inherent in the two modes, but this solution is relatively expensive.

A common drawback of symmetrically connected hydrophones with a single pair of sensitive elements, both inside or outside the housing, is, as shown in FIG. 9, their relatively great capacitance variation with the hydrostatic pressure. It increases with the pressure when the sensitive elements are inside (curve $C_{int}$), whereas it decreases when they are outside (curve $C_{ext}$).

SUMMARY OF THE INVENTION

The hydrophone according to the invention allows, with a single pair of sensitive elements, to overcome the drawbacks of the symmetrically connected hydrophones of the prior art.

It comprises a closed housing delimited by two cups (made for example by a forming process, notably drawing), these two cups resting against each other, each one being provided with a flexible diaphragm and at least two piezoelectric sensitive elements associated each with electrodes and electrically interconnected, these two sensitive elements being respectively fastened to the diaphragms, one outside the housing, the other inside the housing.

According to a preferred embodiment, the hydrophone comprises at least two sensitive elements of different size and for example of different diameter.

The electrodes of the sensitive elements that are not in contact with the cups and the electrodes in contact with the cups are for example electrically interconnected.

The hydrophone according to the invention with a single pair of sensitive elements combines the advantages of the hydrophones of the prior art. Its inter-electrode capacitance is substantially constant within a wide pressure range and, if the sensitive elements are different in size, the sentivity obtained is of the same order of magnitude as the sensitivity obtained with symmetrical connection outside the housing.

According to an embodiment, the hydrophone comprises a rigid tube containing at least one detection unit, a hollowed flat centering element suited to receive and to support at least one housing, this centering element being intended to be fitted into the rigid tube, and a protective sealed coating for each housing and part of the inner face of the rigid tube.

According to an embodiment, the cups of each housing rest against each other by a peripheral edge and the centering element (made all in one piece or made of two parts and removable once a sealed coating has been applied) is provided with an inner slot for insertion of the peripheral edge of the two cups of the housing.

BRIEF DESCRIPTION OF THE DRAWINGS

Other features and advantages of the device according to the invention will be clear from reading the description hereafter of a non limitative example, with reference to the accompanying drawings wherein:

FIG. 1 diagrammatically shows the detection unit of the hydrophone, in sectional view, with unsymmetrical connection of the sensitive elements, FIG. 2 shows the centering element into which the housing of the reception unit fits, FIG. 3 shows a variant in two parts of the centering element, FIG. 6 illustrates the manufacturing process with introduction of the moulding piece in the tube, to confine an injection space around the inserted housing, FIG. 7 shows an embodiment where the centering element is removed after injection and solidification of the substance forming the sheath, FIG. 8 shows a variant of the previous embodiment where part of the space freed after removal of the centering element is occupied by moulding pieces 15, FIG. 9 diagrammatically illustrates the course of the curves showing the variation of the inter-electrode capacitance C of the sensitive elements as a function of the pressure in the case of an outside symmetrical connection (curve $C_{ext}$), of an inside symmetrical connection ($C_{int}$) and in the case of an unsymmetrical connection ($C_{int/ext}$) selected for the hydrophone according to the invention.

DETAILED DESCRIPTION

Figure 4:
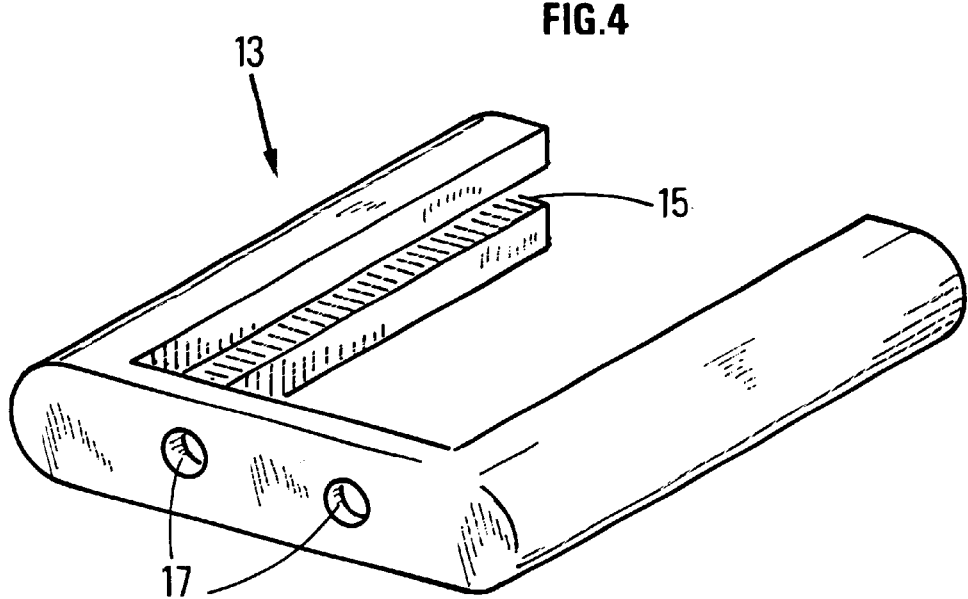
FIG. 4 shows a variant of the embodiment of FIG. 2 with an open end, FIG. 5 diagrammatically shows the device with its tube containing the reception unit.

The hydrophone comprises a housing 1 (FIG. 1) consisting of two identical cups 2, 3 arranged symmetrically, resting against each other on the periphery thereof, provided each for example with an edge or bearing rim 4 and with a flexible central part 5. Both cups can be machined or made by drawing.

A sensitive element 6 such as a piezoelectric ceramic disk for example associated with two electrodes 7a, 7b is stuck onto the outer face of the flexible central part of cup 2 for example. A similar sensitive element 8 similarly associated with electrodes 9a, 9b is fastened to the inner face of flexible part 4 of cup 3. Through a sealed duct such as a glass bead, an electric conductor 10 is associated with electrode 9a of inner sensitive element 8. It is electrically connected to a conductor 11 associated with electrode 7a of sensitive element 6. The opposite electrodes 7b, 9b of these sensitive elements are in electric contact with cups 2, 3 and with another conductor 12 welded onto housing 1. In the case where the housing is made of an insulating material, electric interconnection of electrodes 7b and 9b is of course directly provided by distinct electric wires.

Figure 9:
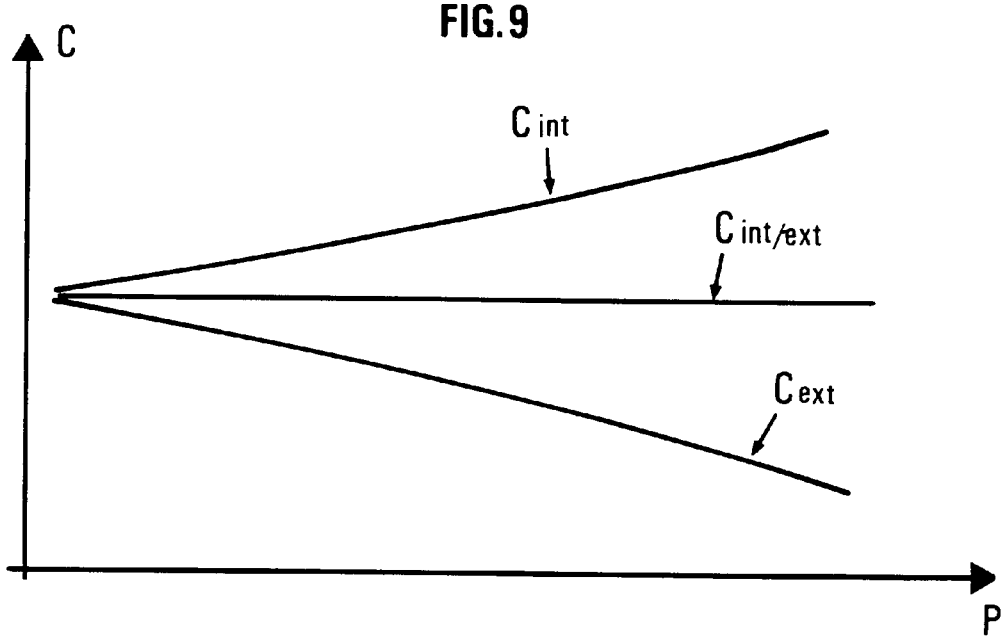
Figure 10:
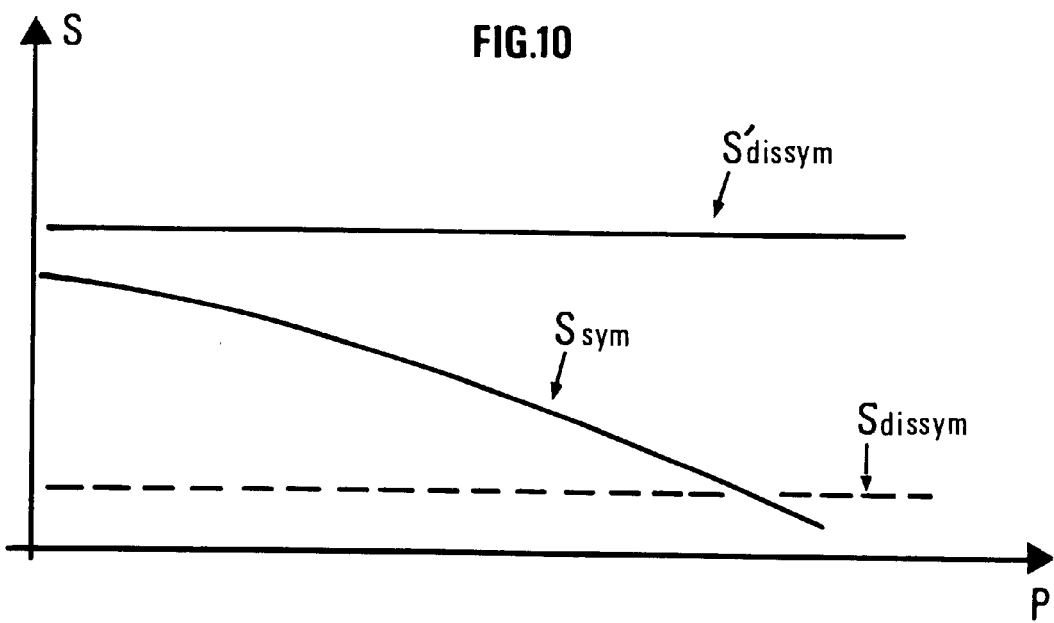
FIG. 10 shows, by way of comparison, the course of the curve showing the sensitivity variation ($S_{unsymm.}$), as a function of the pressure, of the hydrophone according to the invention, and the sensitivity ($S_{sym.}$) that can be obtained with a conventional symmetrical connection.

With this unsymmetrical connection, it has been observed that the global capacitance of the hydrophone is substantially independent of the static pressure exerted by the medium in which it is immersed (curve $C_{int/ext}$ in FIG. 9), but that its sensitivity is relatively low (curve $S_{unsymm.}$ in FIG. 10) if sensitive elements 6, 8 are identical.

It has also been observed that a high sensitivity (curve $S'_{unsymm.}$ in FIG. 10) can be obtained by selecting sensitive elements of different sizes, as shown by the following experimental results. They were obtained with 12-mm and 11-mm piezoelectric disks respectively.

| Pressure/Results in bars | Sensitivity in dB | Sensitivity in V/bar | Capacitance in nF |
| --- | --- | --- | --- |
| 0 | −192.4 | 23.9 | 17.3 |
| 1 | −192.1 | 24.8 | 17.4 |
| 2 | −192.5 | 23.7 | 17.5 |
| 3 | −192.7 | 23.2 | 17.5 |
| 4 | −192.8 | 23 | 17.5 |
| 5 | −192.8 | 22.9 | 17.4 |
| 6 | −192.3 | 22.4 | 17.3 |

The reception unit 1 thus formed can be simply provided with a coating transparent to acoustic waves.

It is preferably included in a protective assembly comprising (FIGS. 2, 3) a flat and thin centering element 3 made of plastic with a central recess 14 whose dimensions are suited to those of housing 1. Two opposite edges of this central recess 14 are provided with slots 15 of spacing d between which the rims 4 of cups 2, 3 can be inserted. The centering element can be made of a single piece (FIG. 2) or of two parts 13a, 13b provided with complementary slots 15 into which rim 4 fits (FIG. 3).

Two opposite edges of centering element 13 are rounded. Their spacing D is suited to the inside diameter of a rigid tube 16 (FIG. 5) into which centering element 13 is to be placed after insertion of housing 1. The other two edges of centering element 13 are crossed by openings 17.

According to the embodiment of FIG. 4, one of the edges is suppressed, centering element 13 being open on this side.

Figure 5:
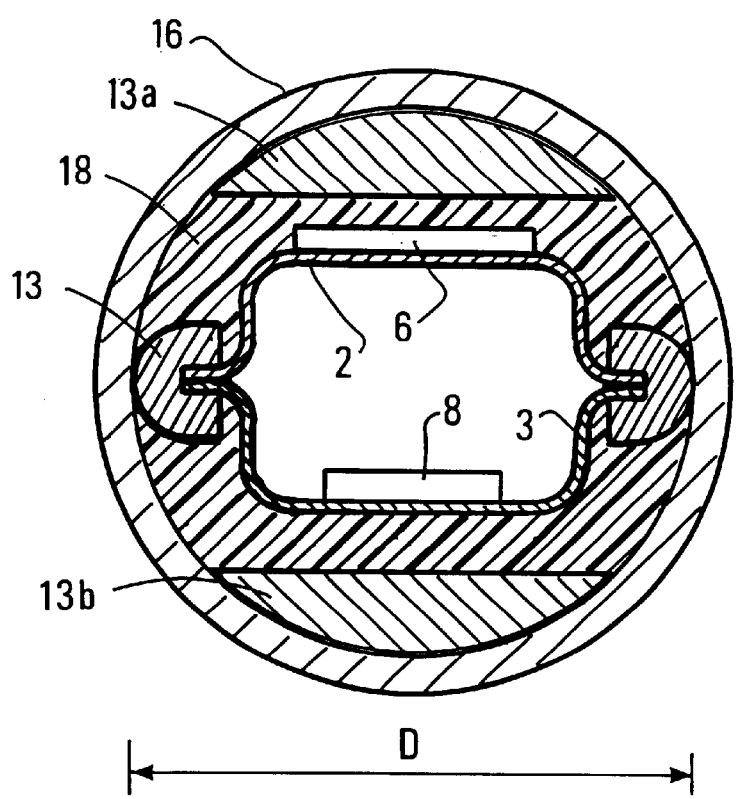

Centering element 13 with its inserted reception unit 1, after being set in tube 16, is embedded in (FIG. 5) a sealed sheath 18 of controlled thickness. A U-shaped moulding part (FIG. 6) is therefore associated with assembly (1, 13) in its rigid tube 16. The two legs 19a, 19b of this U are suited to fit into tube 16 on either side of assembly 1, 13 while leaving a space of well-determined thickness around it. An acoustically transparent plastic material is injected into this free space around assembly 1, 13 through openings 17 provided in the ends of the centering part. After hardening through polymerization, for example, and removal of U-shaped moulding piece 19a, 19b, the coating covers reception unit 1 in its centering element 13 and perfectly follows the inner wall of rigid tube 16 (FIG. 5).

According to the embodiment of FIG. 7, the two parts 13a, 13b of the centering element are removed (see embodiment of FIG. 3) after solidification of the protective sheath. Any direct contact between housing 1 and rigid outer tube 16, which is a possible source of direct vibration transmission, is then suppressed. This freed space 20 can remain empty of material but it can also be entirely filled by injection of a preferably vibration damping sealing material, either totally or only partially (FIG. 8) by interposing moulding pieces 21 prior to injection in order to improve damping of the parasitic vibrations applied to cups 2, 3 and likely to cause interference on the signals.

An embodiment where the rigid tube 9 used is a cylindrical solid of revolution has been described. Such a tube is particularly well-suited in applications where the reception units must be arranged at regular intervals in a seismic streamer towable by a boat for subsea listening or seismic prospecting applications. Any other container whose shape would be more suitable for the use considered could however be used without departing from the scope of the invention.

An embodiment where cups 2, 3 of each housing 1 are provided with rims 4 and centering element 13 is provided with slots 15 supporting these rims has also been described. It would also possible to use, without departing from the scope of the invention, cups without a rim, resting against each other on the periphery thereof, and a centering element 13 suited to sufficiently hold up one or more housings during further installation operations in tube 16.

What is claimed is:

1. A hydrophone comprising a detection unit including a closed housing (1) delimited by two cups (2, 3) resting against each other, each one being provided with a flexible diaphragm (4) and at least two piezoelectric sensitive elements (6, 8) associated each with electrodes (7, 9), characterized in that the two sensitive elements (6, 8) are respectively fastened to diaphragms (4), one outside housing (1), the other inside the housing.

2. A hydrophone as claimed in claim 1, characterized in that sensitive elements (6, 8) are different in size.

3. A hydrophone as claimed in claim 2, characterized in that sensitive elements (6, 8) are different in diameter.

4. A hydrophone as claimed in claim 1, characterized in that electrodes (7*a*, 9*a*) of the sensitive elements that are not in contact with cups (2, 3) are electrically interconnected and the electrodes that are in contact with cups (2, 3) are also electrically interconnected.

5. A hydrophone as claimed in claim 1, characterized in that it comprises a rigid tube (16) for containing at least one detection unit, a hollowed flat centering element (13) suited to receive and to support at least one housing, this centering element being intended to be fitted into rigid tube (16), and a sealed protective coating (18) for each housing (1) and for part of the inner face of rigid tube (16).

6. A hydrophone claim 5, characterized in that cups (2, 3) of each housing (1) rest against each other by a peripheral edge (4).

7. A hydrophone as claimed in claim 6, characterized in that centering element (13) is provided with an inner slot (15) for insertion of peripheral edge (4) of cups (2, 3) of housing (1).

8. A hydrophone as claimed claim 5, characterized in that centering element (13) is made all in one piece.

9. A hydrophone as claimed in claim 5, characterized in that centering element (13) is made of two parts (13*a*, 13*b*) between which each housing (1) is supported.

10. A hydrophone as claimed in claim 5, characterized in that cups (2, 3) are made by means of a forming process, notably by drawing.

11. A hydrophone as claimed in claim 5, characterized in that centering element (13) is contained in the sealed coating.

12. A hydrophone as claimed in claim 5, characterized in that centering element (13) is removable after formation of the sealed coating.

* * * * *